UNITED STATES PATENT OFFICE.

LOUIS HAAS, OF PARIS, FRANCE, ASSIGNOR TO THE SOCIÉTÉ CHIMIQUE DE LA GRANDE
PARSISSE, OF PARIS, FRANCE.

PROCESS FOR THE PREPARATION OF AROMATIC NITRAMINES.

1,423,494.  Specification of Letters Patent.  Patented July 18, 1922.

No Drawing.  Application filed September 2, 1921. Serial No. 498,088.

*To all whom it may concern:*

Be it known that I, LOUIS HAAS, of 12 Rue des Wallons, Paris, France, have invented a Process for the Preparation of Aromatic Nitramines, of which the following is a full, clear, and exact description.

In the preparation of an aromatic nitramine from the corresponding chloronitro-derivative, it is usually necessary to heat the latter with aqueous or alcoholic ammonia under pressure. The object of the present invention is to dispense with heating in an autoclave, and to enable the reaction in question to be effected at relatively low temperatures. To this end and in accordance with the present invention the chloronitro-derivatives in question are heated with ammonium acetate.

The operation is performed in an apparatus provided with a reflux condenser and an agitator.

By way of example the present process may be carried on as follows; 120 kilogrammes of acetic acid (80–95% strength) are saturated with dry ammonia gas. The temperature rises to 125°–130° C. 100 kilogrammes of chlorodinitrobenzene 1:2:4 are introduced by degrees, and the temperature is kept at 125°–130° C., ammonia gas being passed through continuously, with the object of constantly replacing the ammonia which has entered into the reaction, so as to preserve the ammonium acetate for recovery at the close of the operation and for use over again. At the end of several hours, the reaction is complete and the whole of the chlorodinitrobenzene is transformed into dinitraniline 1:2:4. After cooling, the product is filtered and pressed, the filtered liquid being returned to the process. Quantitative yields are obtained and the dinitraniline can be purified by simple washing.

If the chlorodinitrobenzene 1:2:4 of this example be replaced by chlorodinitrobenzene 1:3:4:6, diaminodinitrobenzene 1:3:4:6 will be obtained.

Similarly, the following transformations can be effected by the above process:

Dichlorodinitrobenzene 1:4:3:5, into chloroaminodinitrobenzene 1:4:3:5;

Trichlorodinitrobenzene 1:2:4:3:5, into chlorodiaminodinitrobenzene 1:2:4:3:5;

Trichloronitrobenzene 1:2:4:5, into dichloroaminonitrobenzene 1:2:4:5;

Dichloronitrobenzene 1:2:4 into aminochloronitrobenzene 1:2:4;

Dichloronitrobenzene 1:4:2 into aminochloronitrobenzene 1:4:2;

Chloronitrobenzene 1:2 into aminonitrobenzene 1:2 etc.

It follows naturally that the process can also be applied to all the aromatic chloronitro-derivatives in which the chlorine atoms are capable of being acted upon by ammonia.

It will be understood that the proportions given above are by way of example only and that they are capable of modification according to the applications of the process.

Claims—

1. A process for the preparation of aromatic nitramines, consisting in treating the corresponding chloronitro-derivatives with ammonium acetate in open vessels.

2. A method of carrying out the process claimed in claim 1, consisting in introducing the chloronitro-derivative into acetic acid saturated with gaseous ammonia, maintaining a temperature of approximately 125°–130° C. and continuing to pass gaseous ammonia through so that the ammonium acetate is continuously regenerated.

The foregoing specification of my process for the preparation of aromatic nitramines signed by me this 13th day of August 1921.

LOUIS HAAS.